United States Patent [19]

Takei et al.

[11] Patent Number: 5,710,674
[45] Date of Patent: Jan. 20, 1998

[54] IMAGE PROCESSING SYSTEM CAPABLE OF DISCRIMINATING BETWEEN RECORDED AUDIO AND VISUAL SIGNALS

[75] Inventors: Masahiro Takei; Tomishige Taguchi, both of Urawa, Japan

[73] Assignee: Canon Kabushiki Kaisha, Tokyo, Japan

[21] Appl. No.: 150,257

[22] Filed: Nov. 10, 1993

Related U.S. Application Data

[63] Continuation of Ser. No. 47,355, Apr. 19, 1993, abandoned, which is a continuation of Ser. No. 754,302, Sep. 4, 1991, abandoned, which is a continuation of Ser. No. 431,678, Nov. 3, 1989, abandoned, which is a continuation of Ser. No. 3,770, Jan. 16, 1987, abandoned.

[30] Foreign Application Priority Data

Jan. 27, 1986 [JP] Japan ................................. 61-13698

[51] Int. Cl.$^6$ ................................................. G11B 27/36
[52] U.S. Cl. ...................... 360/31; 360/60; 360/72.1; 386/125; 386/70
[58] Field of Search ....................... 360/33.1, 27, 31, 360/60, 55, 72.1; 358/341, 342; 369/33, 32; 386/45, 70, 125, 126

[56] References Cited

U.S. PATENT DOCUMENTS

| | | | |
|---|---|---|---|
| 4,413,292 | 11/1983 | Sugiyama et al. | 358/342 X |
| 4,433,347 | 2/1984 | Sugiyama et al. | 358/342 |
| 4,541,022 | 9/1985 | Katsuyama | 369/32 X |
| 4,564,867 | 1/1986 | Nakejima | 360/27 X |
| 4,602,295 | 7/1986 | Moriyama et al. | 358/341 X |
| 4,630,144 | 12/1986 | Kutaragi | 360/77.11 |
| 4,641,204 | 2/1987 | Sugiyama et al. | 358/341 |
| 4,646,278 | 2/1987 | Okano | 369/32 |
| 4,740,938 | 4/1988 | Bierhoff et al. | 369/32 |
| 4,772,962 | 9/1988 | Tanaka et al. | 369/32 X |
| 4,779,252 | 10/1988 | Custers et al. | 369/32 |
| 4,872,151 | 10/1989 | Smith | 369/32 X |
| 4,893,193 | 1/1990 | Nakamura et al. | 369/32 X |

FOREIGN PATENT DOCUMENTS

| | | | |
|---|---|---|---|
| 61-99984 | 5/1986 | Japan | 369/33 |
| 61-99986 | 5/1986 | Japan | 369/33 |
| 230675 | 10/1986 | Japan . | |
| 233486 | 10/1986 | Japan . | |

OTHER PUBLICATIONS

"NEC's CD–705E.' Fully Loaded & Less Expensive"; Hart, Digital Audio Feb. 1985, pp. 44,47.

*Primary Examiner*—Andrew L. Sniezek
*Attorney, Agent, or Firm*—Fitzpatrick, Cella, Harper & Scinto

[57] ABSTRACT

A system for automatically reproducing signals from predetermined recording locations on a magnetic disc based on a set program for automatic reproduction of the signals. The system comprises a discrimination circuit for discriminating a recorded signal at each predetermined recording position on the disc and a memory circuit for storing the discrimination results together with their track numbers. The system further comprises a program setting device for setting the automatic reproduction program and a checking circuit for checking the program with reference to the discrimination results stored in the memory circuit. The checking circuit causes a warning circuit to produce a noticeable warning when it is found that the set program is inconsistent with the records on the disc.

20 Claims, 4 Drawing Sheets

FIG. 5

| | | | |
|---|---|---|---|
| 1tR | VIDEO (FI) | 8tR | |
| 2tR | VIDEO (FR) | ⋮ | |
| 3tR | VIDEO (FR) | 20tR | VIDEO (FI) |
| 4tR | AUDIO (2,3) | ⋮ | |
| 5tR | VIDEO (FR) | 30tR | AUDIO |
| 6tR | VIDEO (FR) | ⋮ | |
| 7tR | AUDIO (5,6) | | |

IMAGE PROCESSING SYSTEM CAPABLE OF DISCRIMINATING BETWEEN RECORDED AUDIO AND VISUAL SIGNALS

This application is a continuation of application Ser. No. 08/047,355 filed Apr. 19, 1993, which is a continuation of Ser. No. 07/754,302, filed Sep. 4, 1991, which is a continuation of Ser. No. 07/431,678, filed Nov. 3, 1989, which is a continuation of Ser. No. 07/003,770, filed Jan. 16, 1987, all four now abandoned.

BACKGROUND OF THE INVENTION

1. Field of the Invention

The present invention relates to an information reproducing system and, more particularly, to a system for automatically reproducing information from a record bearing medium according to a preset reproducing program.

2. Description of the Related Art

It has previously been proposed to record not only a video signal but also an audio signal on a video floppy disc in a still video system. Moreover, it has also been proposed to automatically reproduce a floppy disc having different kinds of information signals mixedly recorded thereon according to a preset automatic reproducing program (for example, Japanese Patent Application Nos. Sho. 60-72406 and 60-73237 of the present assignee).

A simplified example of the above mentioned automatic reproducing program will be explained with reference to FIG. 1.

In FIG. 1, a magnetic video floppy disc 1 has, for example, 50 (fifty) recording tracks for video signals and audio signals within a predetermined recording area and one recording track called "Cue Track" for automatic reproducing program data the 52nd (fifty-second) track position counted from the peripheral side of the disc 1. For example, a video signal and an audio signal are recorded on 20th and 30th tracks, respectively. The track numbers are to be counted from the peripheral side of the disc 1.

One possible example of the automatic reproducing program commanding the reproduction of the video signal of the 20th track for 15 (fifteen) seconds and the simultaneous reproduction of the audio signal of the 30th track, can be represented as follows:

00.20.15.11.30

Here, the first two digits "00" mean a command code commanding the reproduction of the signal of the track whose number is represented by the next two digits for a defined period of time represented by the further next two digits. The fourth two digits "11" mean a command code commanding the simultaneous reproduction of the signal of the track whose number is represented by the next two digits.

Thus, the above mentioned example of the program is interpreted to command the reproduction of the signal of the 20th track for 15 seconds and the simultaneous reproduction of the signal of the 30th track. This kind of program data may be recorded on the 52nd track of the disc 1.

Now, when this kind of program for automatic reproduction is to be set, the content of the program should not be inconsistent with the records on the medium, otherwise it becomes impossible to properly reproduce the signals from the medium in a desired manner.

SUMMARY OF THE INVENTION

Thus, according to an aspect of the present invention, there is provided an information reproducing system which comprises search means, storing means, program setting means, checking means and indicating means. The search means searches a record bearing medium for the location thereon of predetermined recorded information. The storing means stores the results of the searching performed by the search means. The program setting means is provided for setting a program for reproducing the predetermined information from predetermined locations on the medium. The checking means compares the stored results in the storing means with the predetermined locations set by the setting means. The indicating means is responsive to the output of the checking means to produce signals representative of the presence of recorded predetermined information at the predetermined locations.

A preferred embodiment further comprises recording means for recording the program set by the setting means on the medium. In this case, the system preferably further comprises recording control means for controlling the recording of the set program by the recording means on the basis of an output of the checking means. The recording control means is arranged to inhibit the recording of the set program by the recording means when the output of the checking means indicates that the set program is inconsistent with the search result stored in the storing means.

In one preferred form, the system comprises warning means for producing a noticeable warning in response to an output of the checking means when the output indicates that the set program is inconsistent with the search result stored in the storing means.

The system preferably also further comprises display means for displaying the stored content of the storing means.

The system may further comprise reproducing means and reproducing control means. The reproducing means reproduces the information from the medium. The reproducing control means controls the reproducing operation of the reproducing means on the basis of the program set by the setting means.

In one aspect of the invention, the search means includes detection means for detecting a record at each recording position on the medium. In this case, the storing means is arranged to store a detection output of the detection means at each recording position on the medium together with an identification thereof. The search means preferably further includes transducing head means and moving means. The head means is arranged in transducing relationship with the medium. The moving means produces relative movement between the head means and the medium to bring together the head means and each recording position on the medium. In this case, the detection means is arranged to detect the record on the basis of an output of the head means. The head means is preferably arranged to be movable relative to the medium. In this case, the moving means is arranged to move the head means along a recording surface of the medium. The information includes a video signal and an audio signal and the detection means includes a discrimination circuit for discriminating which of the video signal and the audio signal is recorded.

The medium is preferably disc shaped and the system preferably further comprises a spindle to rotate the disc shaped medium.

The head means may be used as a recording and/or reproducing head.

Thus, by the feature of the aspect of the present invention, it becomes possible to set a program for automatically reproducing, properly and consistency, with the records on the medium, thereby ensuring proper reproduction of the information from the medium in a desired manner.

As is embodied in a preferred embodiment, the information recording system may be provided with a function for displaying the kind of information recorded in each track on the medium for facilitating the program setting. The above and other aspects, features and advantages of the present invention will become apparent from the following detailed description of the preferred embodiment referring to the accompanied drawings.

BRIEF DESCRIPTION OF THE DRAWINGS

FIG. 5 is an illustration of an example of a display on a display device 20 incorporated in the system shown in FIG. 2.

DETAILED DESCRIPTION OF THE PREFERRED EMBODIMENT

Figure 2:
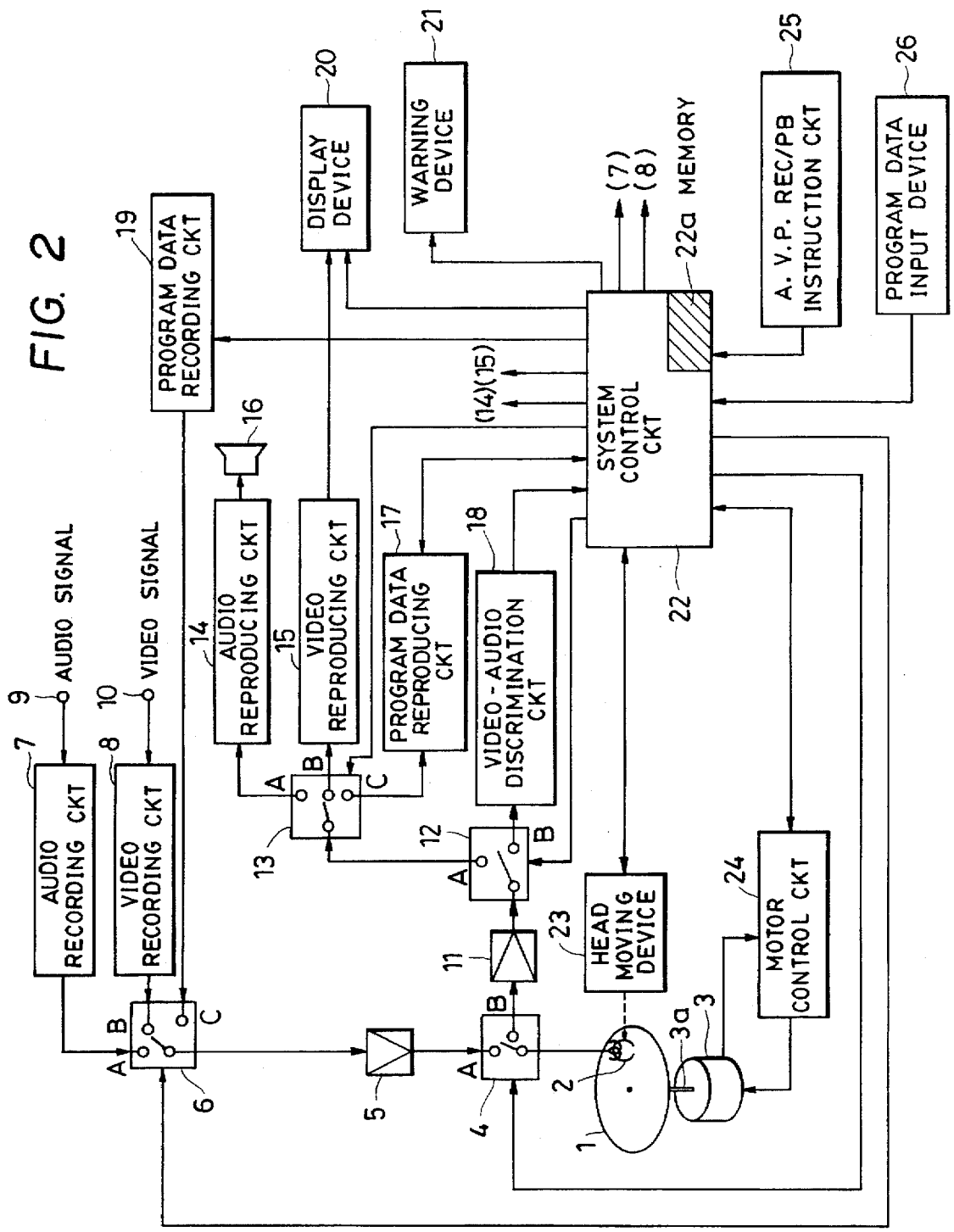
FIG. 2 is a block diagram of a recording and reproducing system constituting an embodiment of the present invention.

In FIG. 2, there is shown in block design form an electrical circuit system constituting one embodiment of the present invention.

In FIG. 2, the magnetic video floppy disc 1 is mounted on an output spindle shaft 3a of a disc drive motor 3. A motor control circuit 24 is connected to control the motor 3 under the control of a system control circuit 22.

A magnetic recording and reproducing head 2 is arranged in transducing relationship with the disc 1. A head moving device 23 is connected to move the head 2 along a recording surface of the disc 1 under the control of the system control circuit 22.

A switch circuit 4 is connected to be controlled by the system control circuit 22 for selectively connecting the head to an output of a recording amplifier 5 (terminal A) and to an input of a reproducing amplifier 11 (terminal B).

A switch circuit 6 is connected to be controlled by the system control circuit 22 for selectively connecting an input of the recording amplifier 5 to an output of an audio recording circuit 7 (terminal A), to an output of a video recording circuit 8 (terminal B) and to an output of a program data recording circuit 19 (terminal C).

The audio recording circuit 7 is connected to receive an audio signal input through an input terminal 9 and to process the input signal into an audio recording signal by time compression and frequency modulation, etc., under the control of the system control circuit 22. The audio recording circuit 7 includes a memory and is controlled by the system control circuit 22 to provide the audio recording signal to the output terminal A.

The video circuit 8 can operate selectively either in a field recording mode or a frame recording mode in which two successive field image signals are recorded in two adjacent tracks. The video circuit 8 is connected to receive a video signal input through an input terminal 10 and to process the input signal into a video recording signal by frequency modulation, etc. The video recording circuit 8 is controlled by the system control circuit 22 to provide the video recording signal to the output terminal B.

Both the audio recording circuit and the video recording circuit can record data signals necessary for discrimination, together with the audio and video signals to be recorded. In addition, the audio recording circuit records, together with the audio signal, information concerning the No. of the track in which the video signal associated with the above-mentioned audio signal is recorded. On the other hand, the video recording circuit records, together with the video signal, a signal for discriminating whether the above-mentioned video signal is a field video signal or a frame video signal. The program data recording circuit 19 is connected to receive a program data signal supplied by the system control circuit 22 and to process the received program data signal into a program data recording signal by digital modulation, etc. The program data recording circuit 19 includes a memory and is controlled by the system control circuit 22 to provide the program data recording signal to the output terminal C.

A switch circuit 12 is connected to be controlled by the system control circuit 22 for connecting an output of the reproducing amplifier 11 to an input of a switch circuit 13 (terminal A) and to an input of a video-audio discrimination circuit 18 (terminal B), selectively.

The video-audio discrimination circuit 18 is connected to provide its output to the system control circuit 22.

The video-audio discrimination circuit is capable of discriminating, through examining the data signal recorded in the disc together with the video and audio signals, whether the signal is an audio signal or a video signal. The discrimination between the video signal and the audio signal may be conducted through checking whether a synchronizing signal exists or not. The switch 13 receives recorded signals picked up from the disc 1 by the head 2 and supplied through terminal B of the switch 4, the amplifier 11 and terminal A of the switch 12. The switch 13 is controlled by the system control circuit to direct these signals selectively via an output terminal A to the audio reproducing circuit 14, via an output terminal B to the video reproducing circuit 15 and via an output terminal C to the program data reproducing circuit 17.

The audio reproducing circuit 14 is connected to process a picked up audio recording signal by frequency demodulation and time expansion, etc. and to provide a processed audio signal to a speaker 16, under the control of the system control circuit 22. The audio reproducing circuit 14 includes a memory which stores the processed audio signal so that it can be output at a time corresponding to a command from the system control circuit 22.

The video reproducing circuit 15 is connected to process a picked up video recording signal by frequency demodulation, etc. and to provide a processed video signal to a display device 20, under the control of the system control circuit 22.

The display device 20 incorporates a character generator, so that it has a function for displaying the data signals from the control circuit 22 after conversion of these signals into characters, as well as a function for monitoring reproduction output from the video reproducing circuit 15.

The program data reproducing circuit 17 is connected to process a picked up program data recording signal by digital demodulation, etc. and to provide a processed program data signal to the system control circuit 22, under the control thereof. The program data reproducing circuit 17 also includes a memory which stores the processed program data signal so that it can be output at a time corresponding to a command from the system control circuit 22.

A warning device 21 is connected to produce a noticeable warning such as a sound emission, under the control of the system control circuit 22.

An audio/video/program data recording and reproducing (A.V.P. REC/PB) instruction circuit 25 is connected to instruct the system control circuit 22 to record or reproduce the audio or the video or the program data signal.

A program data input device 26 is connected to input the program data into the system control circuit 22.

The system control circuit 22 is connected to control the entire circuit system based on the outputs of the circuits 17, 18 and 23 to 25 and of the input device 26. The system control circuit 22 may comprise a micro-computer and it also includes a data memory 22a.

Each of the elements shown in block diagram form in FIG. 2 is well known per se and the operation of the invention is not dependent on any specific configuration of these elements.

The operation of the system of FIG. 2 will now be explained.

In the case of video signal recording, an instruction for recording of the video signal is given to the system control circuit 22 through the instruction circuit 25. In response to this instruction, the system control circuit 22 causes the motor control circuit 24 to operate the motor 3 so that the disc 1 is rotated at a predetermined speed (3,600 rpm in NTSC system, for example) and in a predetermined phase relationship relative to a vertical synchronization portion of the video signal. The system control circuit 22 then operates the head moving device 23 to move the head 2 to an instructed or a predetermined recording position on the disc 1. At the same time, the system control circuit 22 causes the switch circuit 4 to connect the head 2, via the switch terminal A, with the output of the recording amplifier 5 and the switch circuit 6 to connect the input of the amplifier 5, via the switch terminal B, with the output of the video recording circuit 8.

In this condition, the video recording circuit 8 processes the video signal supplied through the input terminal 10 and converts it to a video recording signal. After the motor 3 has reached a predetermined stable rotation state (which is indicated by an output of the motor control circuit 24 to the system control circuit. 22), when triggered through the instruction circuit 25, the system control circuit 22 immediately triggers the video recording circuit 8. Thus, the video recording circuit 8 outputs the video recording signal for one TV field in synchronism with the vertical synchronization signal right after the triggering by the system control circuit 22. This output video recording signal is supplied to the head 2 through the switch circuits 6 and 4 and the amplifier 5 and is recorded on the disc 1 while forming a circular recording track.

Next, in the case of audio signal recording, an instruction for recording of the audio signal is given to the system control circuit 22 through the instruction circuit 25. In response to this instruction, the system control circuit 22 operates the motor control circuit 24 and the head moving device 23 in the same way as in the case of recording the video signal, explained above. At the same time, the system control circuit 22 causes the switch circuit 4 to connect the head 2, via the switch terminal A, with the output of the recording amplifier 5 and the switch circuit 6 to connect the input of the amplifier 5, via the switch terminal A, with the output of the audio recording circuit 7.

In this condition, when triggered through the instruction circuit 25, the system control circuit 22 immediately triggers the audio recording circuit 7. Thus, the audio recording circuit 7 begins to time compress and store the audio signal, which it has received through the input terminal 9, for a predetermined period of time and then outputs the stored audio recording signal for a maximum of one TV field period in synchronism with a predetermined rotation phase of the disc 1. This output audio recording signal is supplied to the head 2 through the switch circuits 6 and 4 and the amplifier 5; and is recorded on the disc 1 while forming a circular recording track.

Figure 1:
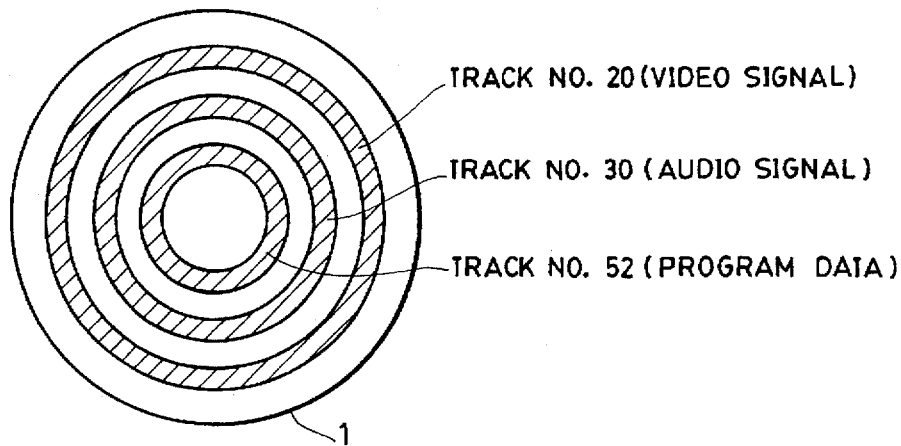
FIG. 1 is a schematic plan view of a magnetic recording disc used with the present invention.

The operation at the time of setting of the automatic reproducing program will now be explained with reference to FIGS. 1 to 3.

In the case of setting of the automatic reproducing program, an instruction for setting of the program is given to the system control circuit 22 through the instruction circuit 25. In response to the instruction, the system control circuit 22 checks for the loading of the disc 1 onto the spindle 3a of the motor 3 (step S31 in FIG. 3). If the disc 1 is detected to be loaded, the system control circuit 22 performs the following operations at a step S32 in FIG. 3 for searching for records on the disc 1 and for storing the search result:

At first, the system control circuit 22 causes the switch circuit 4 to connect the head 2, via the switch terminal B, with the input of the reproducing amplifier 11 and the switch circuit 12 to connect the output of the amplifier 11, via the switch terminal B, with the input of the video-audio discrimination circuit 18. The system control circuit 22 then causes the motor control circuit 24 to operate the motor 3 and the head moving device 23 to place the head 2 at the first track position on the disc 1.

After the motor 3 has reached the predetermined stable rotation state, the system control circuit 22 checks the output of the discrimination circuit 18 to ascertain whether a signal is recorded. If a signal is found to be recorded, the system control circuit 22 checks to ascertain which of the video signal and the audio signal is recorded on the first track of the disc 1. The system control circuit 22 stores the result of this check in the memory 22a so that it corresponds to the track number. It will be readily apparent, of course, that depending on the particular memory being used, the location in the memory of a stored signal may correspond to the location of the recording on the disc, or, the stored signs in the memory may be accompanied by an address which represents the location of the recording on the disc. The system control circuit 22 then operates the head moving device 23 to place the head 2 at the second track position on the disc 1 and repeats the checking and the storing operation on the second track. This operation is repeated until the checking and the storing operation on the last (i.e. the 50th) track has been finished.

Figure 3:
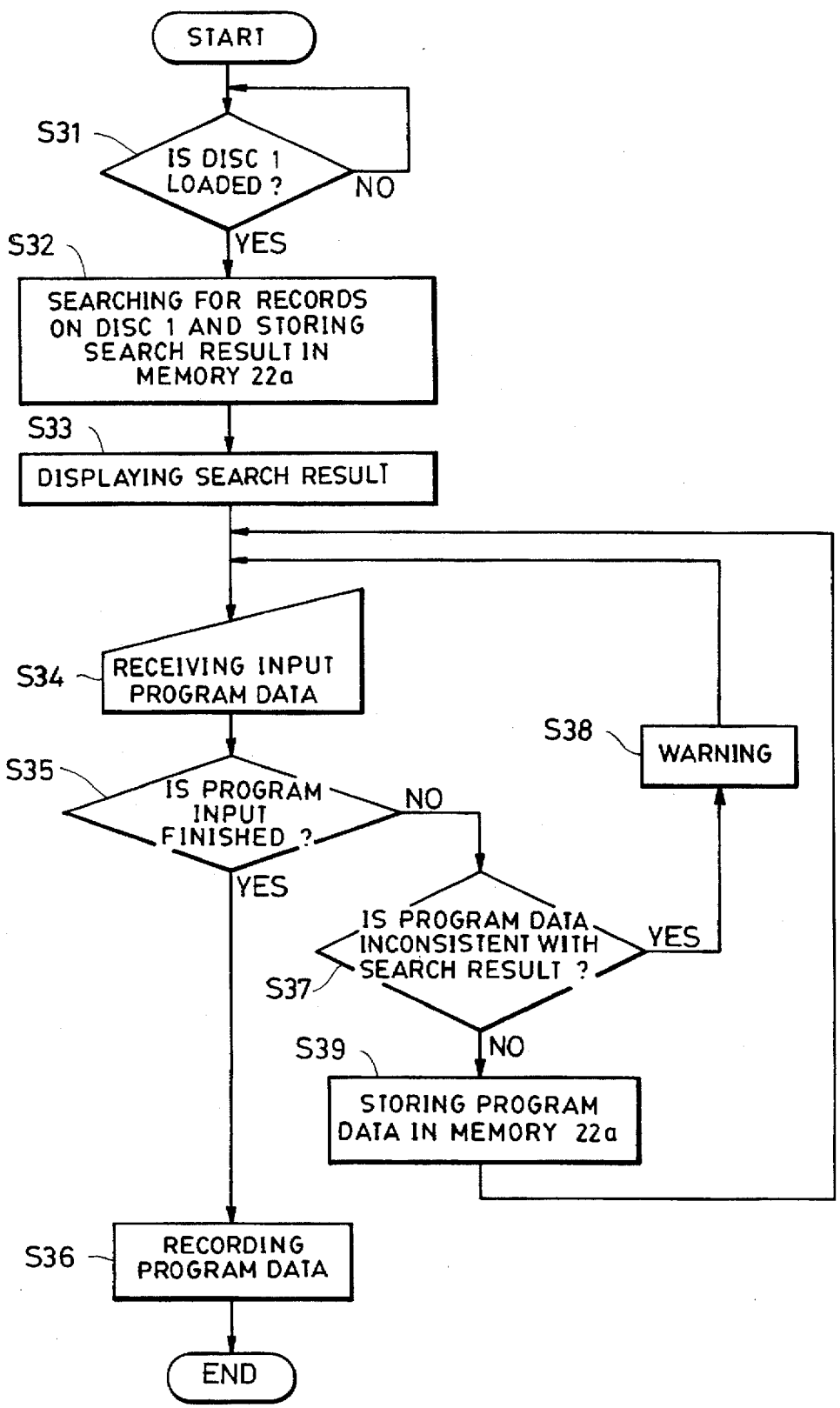
FIG. 3 is a flow chart showing the operation of setting and recording of an automatic reproducing program in the system of FIG. 2.

When the checking and the storing operation on the last i.e. the 50th) track has been finished at the step S32, the system control circuit 22 supplies the check results stored in the memory 22a to the display device 20 and causes the display device 20 to display the check results for each of the tracks of the disc 1 (step S33 in FIG. 3). In this case, the display device 20 is provided with a character generator for converting the check results into characters. For instance, FIG. 5 shows that stores a video signal in the field recording mode, while 2tR and 3tR store video signals in the frame recording mode. Similarly, an audio. signal is recorded in 4tR. Numerals attached to "audio", which represents that the signal is an audio signal, show the Nos. of the tracks in Which the video signal associated with this audio signal is recorded.

Thus, the operator can input and set the automatic reproducing program through the program data input device 26 with reference to the check results displayed on the display device 20.

Here, the system control circuit 22 may be arranged to cause the motor control circuit 24 to stop the motor 3 at the end of the step S32.

At each time that one program data word is received (step S34 in FIG. 3), the system control circuit 22 ascertains whether the then input data word indicates the end of the program (S35 in FIG. 3). If the data word does not indicate the end of the program, the system control circuit 22 checks the then input data to ascertain whether it is inconsistent with the search result obtained at the step S32 and stored in the memory 22a (step S37 in FIG. 3). If the data is found to be inconsistent with the search result (for example, in the case where the then input data indicates the reproduction of the "video" signal from the 30tR track of the disc 1 shown in FIG. 5), the system control circuit 22 causes the warning device 21 and the display device 20 to produce noticeable warning indications, respectively (step S38 in FIG. 3) and then goes back to the step S34 while inhibiting the storing and the recording of the incorrect program data.

On the other hand, is the data if found to be not inconsistent with the search result, the system control circuit 22 stores the then input program data into the memory circuit 22a (step S39 in FIG. 3) and then goes back to the step S14.

The system control circuit 22 repeats the above mentioned checking and storing operation of the program data until the last program data indicating the end of the program has been received.

When it is found at the step S35 that the data indicating the end of the program is received at the step S34, the system control circuit 22 goes to a step S36 to record the set program on the disc 1. At the step S36, the system control circuit 22 performs the following operations:

At first, the system control circuit 22 again causes the motor control circuit 24 to operate the motor 3 if the motor 3 has been stopped at the end of the step S32 and then operates the head moving device 23 to place the head at the 52nd track position on the disc 1. The system control circuit 22 then supplies the program data stored in the memory 22a to the program data recording circuit 19. When it has received the program data signals from the memory 22a, the data recording circuit 19 processes the input program data signal into the program data recording signal by digital modulation. The system control circuit 22 then causes the switch circuit 4 to connect the head 2, via the switch terminal A, with the output of the recording amplifier 5 and the switch circuit 6 to connect the input of the amplifier 5, via the switch terminal C, with the output of the program data recording circuit 19.

After the motor 3 has reached the stable rotation state, when triggered through the instruction circuit 25, the system control circuit 22 immediately triggers the program data recording circuit 19. Thus, the program data recording circuit 19 outputs the program data recording signal in synchronism with the predetermined rotation phase of the disc 1. This output program data recording signal is supplied to the head 2 through the switch circuits 6 and 4 and the amplifier 5 and is recorded on the disc 1 while forming a circular recording track at the 52nd track position.

Next, the automatic signal reproducing operation based on the program will be explained with reference to FIGS. 1, 2 and 4.

In the case of automatic signal reproduction, an instruction for same is given to the system control circuit 22 through the instruction circuit 25. In response to the instruction, the system control circuit 22 checks for the loading of the disc 1 onto the spindle 3a of the motor 3 (step S41 in FIG. 4). If the disc 1 is detected to be loaded, the system control circuit 22 performs the following operations at a step S42 in FIG. 4 for reading out the recorded program from the disc 1:

At first, the system control circuit 22 causes the motor control circuit 24 to operate the motor 3. The system control circuit 22 also causes the head moving device 23 to place the head 2 at the 52nd track position on the disc 1. The system control circuit 22 then causes the switch circuit 4 to connect the head 2, via the switch terminal B, with the input of the reproducing amplifier 11. The control circuit also causes the switch circuit 12 to connect the output of the amplifier 11, via the switch terminal A, with the input of the switch circuit 13. Further, the control circuit 22 causes the switch circuit 13 to connect terminal A of the switch circuit 12 via terminal C of the switch circuit 12 to the input of the program data reproducing circuit 17.

After the motor 3 has reached the stable rotation state, the system control circuit 22 triggers the program data reproducing circuit 17. When triggered, the data reproducing circuit 17 reproduces the program data signal from the program data recording signal on the 52nd track picked up through the head 2 and supplies the program data signal to the system control circuit 22. Thus, the system control circuit 22 receives and stores the reproduced program data into the memory 22a.

Figure 4:
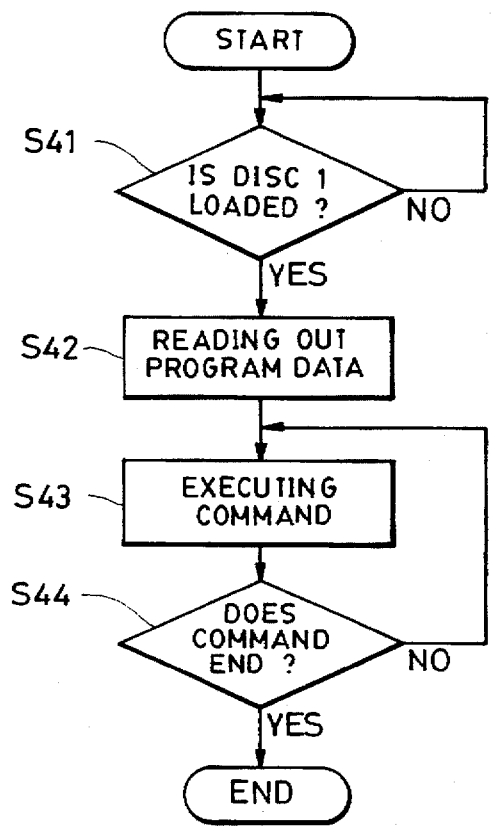
FIG. 4 is a flow chart showing the operation of reproducing of the program in the system of FIG. 2.

After the completion of storing of the reproduced program data, the system control circuit 22 begins to execute the commands represented by the program, one by one (steps S43 and S44 in FIG. 4). For example, if the program is commanding the reproduction of the video signal of the 20th track for 15 seconds and the simultaneous reproduction of the audio signal of the 30th track from the disc 1 shown in FIG. 1 as exemplified above, the system control circuit 22 first operates the head moving device 23 to place the head 2 at the 30th track position on the disc 1 and then causes the switch circuit 13 to connect the terminal A output of the switch circuit 12 with the input of the audio reproducing circuit 14.

After the head 2 has been placed at the 30th track position, the system control circuit 22 triggers the audio reproducing circuit 14. Thus, the audio reproducing circuit 14 processes the audio recording signal picked up through the head 2 from the 30th track into the audio signal and supplies the processed audio signal to the speaker 16 which reproduces the audio sound. Here, the audio reproducing circuit 14 is arranged to store the audio recording signal into the memory to repeatedly and continuously supply the processed audio signal to the speaker 16.

The system control circuit 22 then operates the head moving device 23 to move the head 2 to the 20th track position on the disc 1 and then causes the switch circuit 13 to connect the terminal A output of the switch circuit 12 with the input of the video reproducing circuit 15. After the head 2 has been placed at the 20th track position, the system control circuit 22 triggers the video reproducing circuit 15. Thus, the video reproducing circuit 15 processes the video recording signal picked up through the head 2 from the 20th track into the video signal and supplies the processed video signal to the display device 20 which reproduces a visible still picture.

The system control circuit 22 maintains the above explained reproductions of the audio signal of the 30th track and the video signal of the 20th track for 15 seconds according to the program. When the time period of 15 seconds has elapsed, the system control circuit 22 stops the reproducing operation (step S44 in FIG. 4).

In the case of non-automatic reproduction, the instruction regarding the track number whose recorded signal is to be reproduced should be given to the system control circuit 22 through the instruction circuit 25. When the instruction is given, the system control circuit 22 causes the motor control circuit 24 to operate the motor 3 and the head moving device 23 to move the head 2 to the track position indicated by the instruction. The system control circuit 22 then causes the switch circuit 4 to connect the head 2, via the switch terminal B, with the input of the reproducing amplifier 11 (terminal B) and the switch circuit 12 to connect the output of the amplifier 11 with the input of the video-audio discrimination circuit 18 (terminal B).

After the motor 3 has reached the predetermined stable rotation state, the system control circuit 22 checks the output of the discrimination circuit 18 to ascertain which of the video signal and the audio signal is recorded on the indicated track. If the recorded signal is found to be a video signal, the system control circuit 22 causes the switch circuit 12 to connect the output of the amplifier 11, via the switch terminal A, with the input of the switch circuit 13 and the switch circuit 13 to connect the terminal A output of the switch circuit 12, via switch 13 terminal B, with the input of the video reproducing circuit 15 and triggers the video reproducing circuit 15. Thus, the video signal is reproduced.

On the other hand, if the recorded signal is ascertained to be an audio signal, the system control circuit 22 causes the switch circuit 12 to connect the output of the amplifier 11, via the switch terminal A, with the input of the switch circuit 13 and also causes the switch circuit 13 to connect the terminal A output of the switch circuit 12, via the switch circuit 13 terminal A output, with the input Of the audio reproducing circuit 14 and triggers the audio reproducing circuit 14. Thus, the audio signal is reproduced.

The apparatus to which this invention is applicable is not limited to video and audio signal recording apparatus. This invention is applicable also to apparatus of other kinds arranged to record information such as data, etc. Further, the recording method is not limited to magnetic recording; and the record bearing medium is not limited to a disc. The medium may be in the form of a drum or a tape, for example.

As can be readily appreciated from the foregoing description, according to a feature of the present invention, it becomes possible to set a program for automatic reproducing properly and consistent with the records on the medium and thereby enables proper and desired reproduction of the information from the medium.

The present invention need not necessarily be restricted to the above described embodiment but many modifications can be made within the scope of the invention claimed in the appended claims.

What is claimed is:

1. A signal reproducing apparatus comprising:
   movable head means;
   moving means for sequentially moving said head means to different recording positions with respect to the recording surface of a record bearing medium;
   detection means, responsive to an output of said head means, for detecting a type of information recorded at each recording position on the medium by reproducing the information recorded on the medium, the recorded information including two different types of information comprising video information and audio information;
   memory means for storing indicia regarding the type of information detected by said detection means at each recording position;
   program setting means for setting a program for sequentially reproducing information from predetermined recording positions on the medium in accordance with a reproducing order manually set in said program setting means;
   recording heads for recording the program set by said program setting means onto the medium through said head means;
   checking means for comparing the program set by said setting means with the indicia stored in said memory means, before reproducing begins;
   reproducing means for reproducing the information recorded on the medium according to the program set by said program setting means; and
   reproducing control means for controlling the reproducing operation of said reproducing means based on the comparison performed by said checking means.

2. Apparatus according to claim 1, further comprising:
   means for controlling said recording means in accordance with a checking result by said checking means.

3. Apparatus according to claim 2, further comprising:
   warning means for producing warning in response to an output of said checking means which indicates that the set program is inconsistent with the indicia stored in said memory means.

4. Apparatus according to claim 1, further comprising:
   warning means for producing a warning in response to an output of said checking means which indicates that the set program is inconsistent with the indicia stored in said memory means.

5. Apparatus according to claim 1, further comprising:
   display means for displaying a stored content of said memory means.

6. Apparatus according to claim 1, wherein said detection means includes a discrimination circuit for discriminating whether a signal is recorded based on the output of said head means.

7. Apparatus according to claim 1, wherein the information recorded on the medium includes a video signal and an audio signal; and wherein said detection means includes a discrimination circuit for discriminating which of the video signal and the audio signal is recorded based on an output of said head means.

8. Apparatus according to claim 1, wherein said memory means is arranged to store the indicia regarding the recording at each recording position together with an identification thereof as a result of the detection by said detection means.

9. A reproducing and recording apparatus for performing at least one of reproducing and recording a plurality of information in a recording medium, comprising:
   search means for searching the recording condition of the information on the recording medium by reproducing the plurality of information recorded on the recording medium;
   storing means for storing a result of the search;
   program setting means for setting a reproducing sequence of an automatic reproduction for the information recorded in the recording medium;
   checking means for checking the reproducing sequence set by said setting means based on the stored content in said storing means; and
   recording means for recording the reproducing sequence set by said program setting means on the recording medium.

10. A reproducing apparatus according to claim 9, further comprising prohibiting means for prohibiting the recording of said reproducing sequence when said checking means detects that the reproducing sequence is inconsistent with the stored content of said storing means.

11. A reproducing apparatus according to claim 9, further comprising warning means for producing a warning when said checking means detects that the reproducing sequence is inconsistent with the stored content of said storing means.

12. A reproducing apparatus according to claim 9, further comprising display means for displaying the stored content of said storing means.

13. A reproducing apparatus for reproducing a plurality of types of information in a recording medium, comprising:

search means for searching the recording condition of the information on the recording medium by determining types of information recorded on the recording medium;

storing means for storing a result of the search;

manual program setting means for manually setting a reproducing sequence of an automatic reproduction for the information recorded in the recording medium;

checking means for checking whether the reproducing sequence set by said manual program setting means is suitable by comparing the reproducing sequence with the stored content in said storing means; and recording means for recording the reproducing sequence set by said manual program setting means on the recording medium.

14. A reproducing apparatus according to claim 13, further comprising prohibiting means for prohibiting recording of the reproducing sequence when said checking means detects that the reproducing sequence is inconsistent with the stored content of said storing means.

15. A reproducing apparatus according to claim 13, further comprising warning means for producing a warning when said checking means detects that the reproducing sequence is inconsistent with the stored content of said storing means.

16. A reproducing apparatus according to claim 13, further comprising display means for displaying the stored content of said storing means.

17. A reproducing and recording method for performing at least one of reproducing and recording a plurality of information in a recording medium, said method comprising the steps of:

searching a recording condition of the information on the recording medium by reproducing the plurality of information recorded on the recording medium;

storing a result from said searching step in storing means;

setting a reproducing sequence of an automatic reproduction for the information recorded in the recording medium;

checking the reproducing sequence set in said setting step based on the stored content in the storing means; and recording the reproducing sequence set in said setting step on the recording medium.

18. A reproducing and recording method according to claim 17, further comprising a step of prohibiting said recording step of recording the reproducing sequence when, in said checking step, the reproducing sequence is detected to be inconsistent with the stored content of the storing means.

19. A reproducing and recording method according to claim 17, further comprising a step of producing a warning when, in said checking step, the reproducing sequence is detected to be inconsistent with the stored content of the storing means.

20. A reproducing and recording method according to claim 17, further comprising a step of displaying the stored content of the storing means.

* * * * *

UNITED STATES PATENT AND TRADEMARK OFFICE
CERTIFICATE OF CORRECTION

PATENT NO. : 5,710,674
DATED : January 20, 1998
INVENTOR(S) : Masahiro TAKEI et al.

It is certified that error appears in the above-identified patent and that said Letters Patent is hereby corrected as shown below:

COLUMN 2:

Line 65, "consistency" should read --consistently,--.

COLUMN 6:

Line 61, "that stores" should read --that 1tR stores--;
Line 63, "audio," should read --audio--; and
Line 66, "Which" should read --which--.

COLUMN 7:

Line 23, "is the data if" should read --if the data is--; and
Line 26, "step S14" should read --step S34--.

COLUMN 9:

Line 34, "Of" should read --of--.

Signed and Sealed this

Fourteenth Day of July, 1998

*Attest:*

BRUCE LEHMAN

*Attesting Officer*  *Commissioner of Patents and Trademarks*